United States Patent
Matsushita et al.

(10) Patent No.: US 10,611,920 B2
(45) Date of Patent: Apr. 7, 2020

(54) CURABLE COMPOSITION, CURABLE INK, METHOD FOR FORMING TWO-DIMENSIONAL OR THREE-DIMENSIONAL IMAGES, APPARATUS FOR FORMING TWO-DIMENSIONAL OR THREE-DIMENSIONAL IMAGES, CURED PRODUCT, STRUCTURAL BODY, AND PROCESSED PRODUCT

(71) Applicants: Yuuki Matsushita, Kanagawa (JP); Masato Iio, Kanagawa (JP)

(72) Inventors: Yuuki Matsushita, Kanagawa (JP); Masato Iio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 15/646,718

(22) Filed: Jul. 11, 2017

(65) Prior Publication Data
US 2018/0016454 A1 Jan. 18, 2018

(30) Foreign Application Priority Data

Jul. 15, 2016 (JP) .................. 2016-140269
Dec. 9, 2016 (JP) .................. 2016-239084
Jun. 8, 2017 (JP) .................. 2017-113280

(51) Int. Cl.
| | | |
|---|---|---|
| *B05C 5/02* | (2006.01) | |
| *B41J 2/01* | (2006.01) | |
| *B32B 27/30* | (2006.01) | |
| *C08F 2/48* | (2006.01) | |
| *C08F 2/50* | (2006.01) | |
| *C08F 257/02* | (2006.01) | |
| *C08F 283/02* | (2006.01) | |
| *C08F 299/02* | (2006.01) | |
| *C08G 63/78* | (2006.01) | |
| *C09D 11/101* | (2014.01) | |
| *C09D 11/104* | (2014.01) | |
| *C09D 11/106* | (2014.01) | |
| *C09D 11/30* | (2014.01) | |
| *C09D 11/322* | (2014.01) | |

(52) U.S. Cl.
CPC .............. *C09D 11/101* (2013.01); *B05C 5/02* (2013.01); *B32B 27/308* (2013.01); *B41J 2/01* (2013.01); *C08F 2/48* (2013.01); *C08F 2/50* (2013.01); *C08F 257/02* (2013.01); *C08F 283/02* (2013.01); *C08F 299/024* (2013.01); *C08G 63/78* (2013.01); *C09D 11/104* (2013.01); *C09D 11/106* (2013.01); *C09D 11/30* (2013.01); *C09D 11/322* (2013.01); *Y10T 428/31855* (2015.04)

(58) Field of Classification Search
CPC .......... C08F 2/48; C08F 299/024; C08F 2/50; C08F 257/02; C08F 283/02; C08G 63/78; C09D 11/101; C09D 11/322; C09D 11/104; C09D 11/106; C09D 11/30; B05C 5/02; B32B 27/308; B41J 2/01; Y10T 428/31855
See application file for complete search history.

(56) References Cited

U.S. PATENT DOCUMENTS

| | | | | |
|---|---|---|---|---|
| 5,800,907 A | * | 9/1998 | Yumoto ............... | B29C 41/12 428/195.1 |
| 2010/0215921 A1 | * | 8/2010 | Kagose ................ | C08F 2/44 428/195.1 |
| 2017/0008325 A1 | * | 1/2017 | Hiraoka ............... | C09D 167/00 |
| 2018/0273781 A1 | * | 9/2018 | Matsushita .......... | C09D 11/107 |
| 2019/0112409 A1 | * | 4/2019 | Miyachi .............. | B29C 35/0805 |

FOREIGN PATENT DOCUMENTS

| | | |
|---|---|---|
| JP | 2011-122076 | 6/2011 |
| JP | 2013-112691 | 6/2013 |
| JP | 2013-147462 | 8/2013 |
| JP | 2014-156506 | 8/2014 |
| JP | 2015-183146 | 10/2015 |
| JP | 2016-011416 | 1/2016 |
| WO | WO 2013/172480 | * 11/2013 |

* cited by examiner

*Primary Examiner* — Patrick D Niland
(74) *Attorney, Agent, or Firm* — Oblon, McClelland, Maier & Neustadt, L.L.P.

(57) ABSTRACT

A curable composition is provided. The curable composition comprises diethylene glycol dimethacrylate and a resin, and the following conditions (1) to (3) are satisfied:
(1) a mixed solution of 70 parts by mass of the diethylene glycol dimethacrylate and 30 parts by mass of the resin exhibits a viscosity 15 to 30 times that of the diethylene glycol dimethacrylate alone at 25° C.;
(2) the mixed solution exhibits a spin-spin relaxation time of 240 ms or less measured by a CPMG method for pulse nuclear magnetic resonance analysis; and
(3) the resin has a polystyrene or polyester structure.

18 Claims, 2 Drawing Sheets

CURABLE COMPOSITION, CURABLE INK, METHOD FOR FORMING TWO-DIMENSIONAL OR THREE-DIMENSIONAL IMAGES, APPARATUS FOR FORMING TWO-DIMENSIONAL OR THREE-DIMENSIONAL IMAGES, CURED PRODUCT, STRUCTURAL BODY, AND PROCESSED PRODUCT

CROSS-REFERENCE TO RELATED APPLICATIONS

This patent application is based on and claims priority pursuant to 35 U.S.C. § 119(a) to Japanese Patent Application Nos. 2016-140269, 2016-239084, and 2017-113280, filed on Jul. 15, 2016, Dec. 9, 2016, and Jun. 8, 2017, respectively, in the Japan Patent Office, the entire disclosure of each of which is hereby incorporated by reference herein.

BACKGROUND

Technical Field

The present disclosure related to a curable composition, a curable ink, a method for forming two-dimensional or three-dimensional images, an apparatus for forming two-dimensional or three-dimensional images, a cured product, a structural body, and a processed product.

Description of the Related Art

Active energy ray curable compositions have been used for offset printing, screen printing, topcoat agents, etc. Active energy ray curable compositions are now used in much larger amounts due to their advantage in cost reduction by simplified drying processes and that in environment protection by reduced solvent volatilization quantity.

An active energy ray curable composition generally contains a polymerizable compound and a polymerization initiator. In addition, a photopolymerizable composition blended with a resin composition has been proposed.

One advantage of blending a photopolymerizable composition with a resin composition is that the cured product thereof can be securely adhered to relatively smooth plastic substrates that are difficult to permeate for the photopolymerizable composition alone. However, such a photopolymerizable composition blended with a resin composition flies in a trailing manner when jetted, because of having thread-forming property, resulting in long ligaments without becoming clear liquid droplets. Long ligaments have a drawback that the trailing ends thereof are likely to cut off and become mist, thereby causing problems such as misaligned impact position, image staining, and misfiring at high frequencies. These problems are less likely to occur as the length of the ligaments becomes shorter, but remarkably occur when the ligaments have a length of 60 s or longer.

SUMMARY

In accordance with some embodiments of the present invention, a curable composition is provided. The curable composition comprises diethylene glycol dimethacrylate and a resin, and the following conditions (1) to (3) are satisfied:

(1) a mixed solution of 70 parts by mass of the diethylene glycol dimethacrylate and 30 parts by mass of the resin exhibits a viscosity 15 to 30 times that of the diethylene glycol dimethacrylate alone at 25° C.;

(2) the mixed solution exhibits a spin-spin relaxation time of 240 ms or less measured by a CPMG method for pulse nuclear magnetic resonance analysis; and (3) the resin has a polystyrene or polyester structure.

In accordance with some embodiments of the present invention, a curable ink is provided. The curable ink comprises the above curable composition.

In accordance with some embodiments of the present invention, a method for forming two-dimensional or three-dimensional images is provided. The method includes the process of emitting an active energy ray to the above curable composition.

In accordance with some embodiments of the present invention, an apparatus for forming two-dimensional or three-dimensional images is provided. The apparatus includes a storage storing the above curable composition and an emitter to emit an active energy ray.

In accordance with some embodiments of the present invention, a cured product is provided. The cured product is produced by curing the above curable composition.

In accordance with some embodiments of the present invention, a structural body is provided. The structural body includes a substrate and the above cured product.

In accordance with some embodiments of the present invention, a processed product is provided. The processed product is produced by processing the above structural body.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
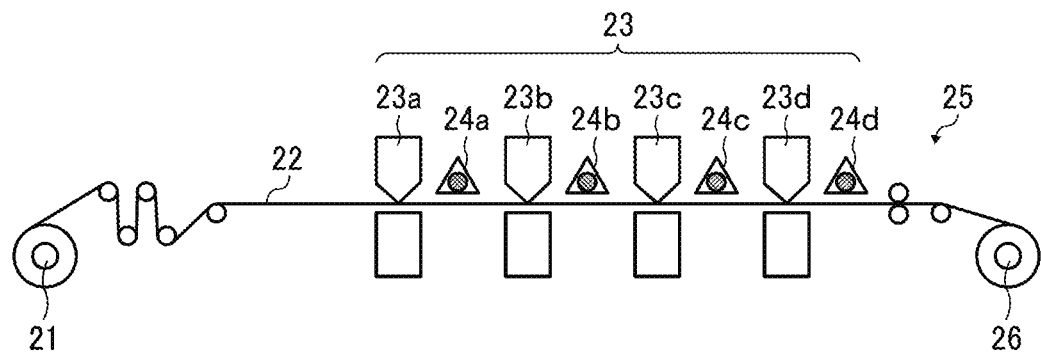
FIG. 1 is a schematic view of an image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a curable composition having excellent dischargeability and adhesiveness to poorly-adhesive substrates is provided.

It is assumed that the curable composition according to an embodiment of the present invention has excellent dischargeability for the following reasons.

With respect to the condition (1), when the mixed solution exhibits a viscosity 15 times or more that of diethylene glycol dimethacrylate alone, in other words, when the viscosity of diethylene glycol dimethacrylate increases 15 times or more after a predetermined amount of the resin is mixed therein, it means that molecules of the resin are spread and dissolved in diethylene glycol dimethacrylate without shrinking by interaction with diethylene glycol dimethacrylate. Therefore, the resin molecules as a whole can receive the force transmitted when the composition is being discharged, resulting in reliable discharging of the composition. When the viscosity increases more than 30 times, the composition is too viscous to be discharged as an inkjet ink in an appropriate manner.

Preferably, the viscosity increases from 15 to 27 times.

The viscosity can be measured with a cone-plate rotary viscometer (VISCOMETER TVE-22L available from Toki Sangyo Co., Ltd.) using a cone rotor (1°34'×R24) while setting the revolution to 50 rpm and the temperature of the constant-temperature circulating water to 25° C. The temperature of the circulating water can be adjusted by an instrument VISCOMATE VM-150III.

With respect to the condition (2), when the spin-spin relaxation time of the mixed solution is 240 ms or less, it means that compatibility of diethylene glycol dimethacrylate and the resin is good and therefore dischargeability is improved. When the spin-spin relaxation time is in excess of 240 ms, it means that molecular mobility is high and therefore dischargeability deteriorates. Preferably, the spin-spin relaxation time is in the range of from 180 to 240 ms.

Pulse NMR (nuclear magnetic resonance) analysis is a known method for rapidly measuring the spin-lattice relaxation time (T1) and spin-spin relaxation time (T2) of 1H nuclear, that have a close relation to molecular mobility, and is widely spread lately. As specific methods of pulse NMR analysis, CPMG (Carr-Purcell-Meiboom-Gill) method, Hahn echo method, solid echo method, and 90° pulse method are known. In the present disclosure, CPMG method is employed that is suitable for measuring long spin-spin relaxation time (T2). CPMG method evaluates molecular mobility by the relaxation time. In the method, the mixed solution is contained in an NMR tube and applied with a high-frequency magnetic field as pulses so that the magnetization vector is declined, and the time until x and y components of the vector disappear is measured as the relaxation time.

The method for measuring spin-spin relaxation time in the present disclosure is described in more detail below.

As a measuring instrument, a minispec mq pulse NMR (available from Bruker) is used.

First, 70 parts by mass of diethylene glycol dimethacrylate and 30 parts by mass of a resin is mixed to prepare a mixed solution, and 1 ml of the mixed solution is weighed in an NMR tube having a diameter of 10 mm.

A measurement is started 5 seconds after the NMR tube is set in the instrument. The measurement is performed three times under the following conditions, and the second and third measurement results, being measured under stable temperature, are averaged.

First 90° Pulse Separation: 0.01 msec
Final Pulse Separation: 0.2 msec
Number of Data Point for Fitting: 3,000 points
Cumulated Number: 32 times
Temperature: 25° C.

The spin-spin relaxation time (T2) is calculated by exponentially approximating the obtained attenuation curve using a software program Origin® 8.5 (available from OriginLab Corp.).

It is known that the spin-spin relaxation time becomes shorter as molecular mobility becomes lower, and becomes longer as molecular mobility becomes higher.

With respect to the condition (3), when the resin has a polystyrene or polystyrene structure, discharge property is improved.

Diethylene Glycol Dimethacrylate

The curable composition according to an embodiment of the present invention includes diethylene glycol dimethacrylate for lowering the viscosity of the composition and improving adhesiveness to poorly-adhesive substrates, curability, and strength of the cured product.

The curable composition may further include acrylate and/or methacrylate other than diethylene glycol dimethacrylate as monomer components. Specific examples of such monomer components include, but are not limited to, t-butyl acrylate, t-butyl methacrylate, n-pentyl acrylate, n-pentyl methacrylate, n-hexyl acrylate, n-hexyl methacrylate, ethylene glycol diacrylate, ethylene glycol dimethacrylate, hydroxypivalic acid neopentyl glycol diacrylate, hydroxypivalic acid neopentyl glycol dimethacrylate, γ-butyrolactone acrylate, isobornyl acrylate, isobornyl methacrylate, trimethylolpropane acrylic acid benzoic acid ester, trimethylolpropane methacrylic acid benzoic acid ester, dipropylene glycol diacrylate, dipropylene glycol dimethacrylate, 1,3-butanediol diacrylate, 1,4-butanediol diacrylate, 1,4-butanediol dimethacrylate, 1,6-hexanediol diacrylate, 1,6-hexanediol dimethacrylate, 1,9-nonanediol diacrylate, 1,9-nonanediol dimethacrylate, neopentyl glycol diacrylate, neopentyl glycol dimethacrylate, tricyclodecane dimethanol diacrylate, propylene-oxide-modified bisphenol A diacrylate, propylene-oxide-modified bisphenol A dimethacrylate, acryloyl morpholine, methacryloyl morpholine, propylene-oxide-modified tetramethylolmethane tetraacrylate, propylene-oxide-modified tetramethylolmethane tetramethacrylate, ditrimethylolpropane tetraacrylate, ditrimethylolpropane tetramethacrylate, pentaerythritol tetraacrylate, pentaerythritol tetramethacrylate, trimethylolpropane triacrylate, ethylene-oxide-modified trimethylolpropane triacrylate, propylene-oxide-modified trimethylolpropane triacrylate, propylene-oxide-modified trimethylolpropane trimethacrylate, caprolactone-modified trimethylolpropane triacrylate, caprolactone-modified trimethylolpropane trimethacrylate, pentaerythritol triacrylate, pentaerythritol trimethacrylate, tris(2-hydroxyethyl) isocyanurate triacrylate, tris(2-hydroxyethyl) isocyanurate trimethacrylate, ethoxylated neopentyl glycol diacrylate, ethoxylated neopentyl glycol dimethacrylate, propylene-oxide-modified neopentyl glycol diacrylate, propylene-oxidemodified neopentyl glycol dimethacrylate, propylene-oxide-modified glyceryl acrylate, propylene-oxide-modified glyceryl methacrylate, polyester diacrylate, polyester dimethacrylate, polyester triacrylate, polyester trimethacrylate, polyester tetraacrylate, polyester tetramethacrylate, polyester pentaacrylate, polyester pentamethacrylate, polyester polyacrylate, polyester polymethacrylate, N-vinyl caprolactam, N-vinyl pyrrolidone, N-vinyl formamide, polyurethane diacrylate, polyurethane dimethacrylate, polyurethane triacrylate, polyurethane trimethacrylate, polyurethane tetraacrylate, polyurethane tetramethacrylate, polyurethane pentaacrylate, polyurethane pentamethacrylate, polyurethane polyacrylate, polyurethane polymethacrylate, triethylene glycol divinyl ether, cyclohexanedimethanol divinyl ether, cyclohexanedimethanol monovinyl ether, diethylene glycol divinyl ether, dicyclopentadiene vinyl ether, tricyclodecane vinyl ether, benzyl vinyl ether, ethyl oxetane methyl vinyl ether, triethylene glycol divinyl ether, and ethyl vinyl ether.

Preferably, the content rate of the diethylene glycol dimethacrylate in the curable composition is in the range of from 40% to 90% by mass, more preferably from 60% to 80% by mass.

Preferably, the content rate of the other monomer components in the curable composition is in the range of from 0% to 50% by mass, more preferably from 0% to 30% by mass.

Monofunctional Acrylate or Methacrylate Having Cyclic Ether Structure

Preferably, the curable composition further includes a monofunctional acylate or methacrylate having a cyclic ether structure. By including the monofunctional acylate or methacrylate having a cyclic ether structure, adhesiveness to glass is more improved. The reason is considered as follows. The cyclic ether structure increases polarity of the composition, thereby improving adhesiveness to glass that is a polar substrate. Being monofunctional suppresses cure shrinkage of the composition and reduces inner stress thereof, thereby improving adhesiveness.

Specific examples of the monofunctional acylate or methacrylate having a cyclic ether structure include, but are not limited to, acryloyl morpholine, cyclic trimethylolpropane formal acylate, tetrahydrofurfuryl methacrylate, (3-ethyloxetane-3-yl) methyl acrylate, (3-ethyloxetane-3-yl) methyl methacrylate, (2-methyl-2-ethyl-1,3-dioxolan-4-yl) methyl acrylate, and (2-methyl-2-ethyl-1,3-dioxolan-4-yl) methyl methacrylate.

Preferably, the monofunctional acylate or methacrylate having a cyclic ether structure accounts for 10 to 30 parts by mass out of 100 parts by mass of the diethylene glycol dimethacrylate, the monofunctional acylate or methacrylate having a cyclic ether structure, and the resin in total. When the monofunctional acylate or methacrylate having a cyclic ether structure accounts for 10 parts by mass or more, adhesiveness to glass is expressed. When the monofunctional acylate or methacrylate having a cyclic ether structure accounts for 30 parts by mass or less, the viscosity is adjusted to within a proper range as an inkjet ink. For film coating property, the glass transition temperature (Tg) of the monofunctional acylate or methacrylate having a cyclic ether structure is 0° C. or higher.

Resin

The resin according to an embodiment of the present invention has a polystyrene or polyester structure.

When having a polystyrene structure, preferably, the resin has a weight average molecular weight of from 2,000 to 50,000, more preferably from 2,000 to 10,000.

When having a polyester structure, preferably, the resin has a weight average molecular weight of from 2,000 to 50,000, more preferably from 2,000 to 10,000.

The resin exerts no influence on dischargeability even when being mixed in the mixed solution of the diethylene glycol dimethacrylate and the monofunctional acylate or methacrylate having a cyclic ether structure.

For dischargeability and adhesiveness to poorly-adhesive substrates, the content of the resin in the composition is preferably determined as follows. In a case in which the composition does not contain the monofunctional acylate or methacrylate having a cyclic ether structure, preferably, the resin accounts for 5 to 20 parts by mass, more preferably from 10 to 20 parts by mass, and most preferably from 15 to 20 parts by mass, out of 100 parts of the diethylene glycol dimethacrylate and the resin in total.

In a case in which the composition does contain the monofunctional acylate or methacrylate having a cyclic ether structure, preferably, the resin accounts for 5 to 20 parts by mass, more preferably from 10 to 20 parts by mass, and most preferably from 15 to 20 parts by mass, out of 100 parts of the diethylene glycol dimethacrylate, the monofunctional acylate or methacrylate having a cyclic ether structure, and the resin in total.

When the resin accounts for 5 parts by mass or more, dischargeability is improved. When the resin accounts for 20 parts by mass or less, adhesiveness to poorly-adhesive substrates is improved and discharging at high frequencies becomes possible.

Polymerization Initiator

The curable composition according to an embodiment of the present invention may further include a polymerization initiator. The polymerization initiator is a material capable of generating active species, such as radical and cation, by the action of active energy rays, to cause polymerizable compounds (e.g., monomer, oligomer) to initiate a polymerization. Examples of the polymerization initiator include radical polymerization initiators, cationic polymerization initiators, base generators, and combinations thereof. In particular, radical polymerization initiators are preferable. In order to secure a sufficient curing speed, the content rate of the polymerization initiator in the composition (100% by mass) is preferably in the range of from 5% to 20% by mass.

Specific examples of the radical polymerization initiators include, but are not limited to, aromatic ketones, acylphosphine oxide compounds, aromatic onium salt compounds, organic peroxides, thio compounds (e.g., thioxanthone compounds, thiophenyl-group-containing compounds), hexaaryl biimidazole compounds, ketoxime ester compounds, borate compounds, azinium compounds, metallocene compounds, active ester compounds, carbon-halogen-bond-containing compounds, and alkylamine compounds.

The polymerization initiator can be used in combination with a polymerization accelerator (sensitizer). Specific examples of the polymerization accelerator include, but are not limited to, amine compounds, such as trimethylamine, methyldimethanolamine, triethanolamine, p-diethylaminoacetophenone, p-dimethylaminobenzoate, 2-ethylhexyl p-dimethylaminobenzoate, N,N-dimethylbenzylamine, and 4,4'-bis(diethylamino)benzophenone. The content of the polymerization accelerator is determined depending on the type and amount of the polymerization initiator used in combination. In a case in which high-energy rays, such as electron beam, are used, the polymerization initiator is not necessary.

When the curable composition contains the polymerization initiator, preferably, the polymerization initiator is 1-hydroxy-cyclohexyl-phenyl-ketone or 2-dimethylamino-2-(4-methyl-benzyl)-1-(4-morpholine-4-yl-phenyl)-butane-1-one.

The former is commercially available from BASF under the trade name of IRGACURE 184. The latter is commercially available from BASF under the trade name of IRGACURE 379.

The viscosity of the curable composition is adjusted in accordance with the purpose of use or application. When the curable composition is applied to a discharge device that discharges the composition from nozzles, the viscosity of the composition is preferably adjusted to from 3 to 40 mPa·s, more preferably from 5 to 15 mPa·s, and most preferably from 6 to 12 mPa·s, at a temperature of from 20° C. to 65° C., more preferably at 25° C. Preferably, the curable composition exhibits a viscosity within the above-described range without including any organic solvent. The viscosity can be measured with a cone-plate rotary viscometer (VISCOMETER TVE-22L available from Toki Sangyo Co., Ltd.) using a cone rotor (1°34'×R24) while setting the revolution to 50 rpm and the temperature of the constant-temperature circulating water to from 20° C. to 65° C. The temperature of the circulating water can be adjusted by an instrument VISCOMATE VM-150III.

Curing Device

Preferably, the curable composition according to an embodiment of the present invention is cured by application of heat or irradiation with an active energy ray, and the latter is more preferred.

Specific examples of active energy rays for curing the curable composition include, but are not limited to, ultraviolet ray, electron beam, $\alpha$-ray, $\beta$-ray, $\gamma$-ray, and X-ray, each of which is capable of giving energy to polymerizable compounds included in the curable composition to cause a polymerization reaction. In a case in which the active energy ray is emitted from a high-energy light source, the polymerizable compound can undergo a polymerization reaction without a polymerization initiator. In the case of ultraviolet ray emission, a GaN-based semiconductor ultraviolet light emitting device is preferably used as the light source from both industrial and environmental aspects. In particular, mercury-free light sources are strongly demanded in accordance with the increasing momentum of environment preservation. In addition, ultraviolet light-emitting diode (UV-LED) and ultraviolet light laser diode (UV-LD) are preferable since they are advantageous in terms of their compact size, extended lifespan, high efficiency, and low cost.

Colorant

The curable composition may further include a colorant. Examples of the colorant include pigments and dyes with various colors such as black, white, magenta, cyan, yellow, green, and orange, or metallic colors such as gold and silver. Which colorant to select is determined depending on the purpose of use and demand characteristics of the composition. Preferably, the content rate of the colorant in the composition is in the range of from 0.1% to 20% by mass, but it can be determined in view of a desired color density and dispersibility of the colorant in the composition. Alternatively, the curable composition may include no colorant. In this case, the curable composition is colorless and transparent, and therefore preferably applied to an overcoat layer for protecting an image.

Usable pigments include both inorganic pigments and organic pigments. Two or more of these pigments can be used in combination.

Specific examples of inorganic pigments include, but are not limited to, carbon blacks (i.e., C.I. Pigment Black 7) such as furnace black, lamp black, acetylene black, and channel black; iron oxides; and titanium oxides.

Specific examples of organic pigments include, but are not limited to, azo pigments (e.g., insoluble azo pigments, condensed azo pigments, azo lakes, chelate azo pigments), polycyclic pigments (e.g., phthalocyanine pigments, perylene pigments, perinone pigments, anthraquinone pigments, quinacridone pigments, dioxane pigments, thioindigo pigments, isoindolinone pigments, quinophthalone pigments), dye chelates (e.g., basic dye chelates, acid dye chelates), dye lakes (e.g., basic dye lakes, acid dye lakes), nitro pigments, nitroso pigments, aniline black, and daylight fluorescent pigments.

The curable composition may further include a dispersant for improving dispersibility of the colorant. Examples of the dispersant include, but are not limited to, polymeric dispersants commonly used for preparing pigment dispersions.

Usable dyes include acid dyes, direct dyes, reactive dyes, and basic dyes. Two or more of these dyes can be used in combination.

Organic Solvent

The curable composition may include an organic solvent. However, it is more preferable that the curable composition includes no organic solvent. When the curable composition includes no organic solvent, in particular, when the composition is VOC (volatile organic compound) free, a higher degree of safety is provided at sites where the composition is being handled while environment pollution is prevented. Here, the organic solvent refers to a typical non-reactive organic solvent, such as ether, ketone, xylene, ethyl acetate, cyclohexanone, and toluene. The organic solvent is discriminated from a reactive monomer. When the composition is stated to include no organic solvent, it means that the composition "substantially" include no organic solvent. In this case, the content rate of the organic solvent in the composition is preferably less than 0.1% by mass.

Other Components

The curable composition may optionally include other components, if necessary. The curable composition may further include other components, such as a surfactant, a polymerization inhibitor, a leveling agent, a defoamer, a fluorescence brightening agent, a permeation accelerator, a wetting agent (humectant), a fixing agent, a viscosity stabilizer, a fungicide, a preservative, an antioxidant, an ultraviolet absorber, a chelate agent, a pH adjuster, and a thickening agent.

Preparation of Curable Composition

The curable composition may be prepared by: dispersing a polymerizable monomer, a pigment, a dispersant, etc., by a disperser (e.g., ball mill, disc mill, pin mill, DYNO-MILL) to prepare a pigment dispersion liquid; and further mixing a polymerizable monomer, a polymerization initiator, a polymerization inhibitor, a surfactant, etc., in the pigment dispersion liquid. The preparation method is not limited thereto.

Use Application

The curable composition can be applied to, for example, modeling resins, paints, adhesives, insulating materials, release agents, coating materials, sealing materials, resists, and optical materials.

Figure 2:
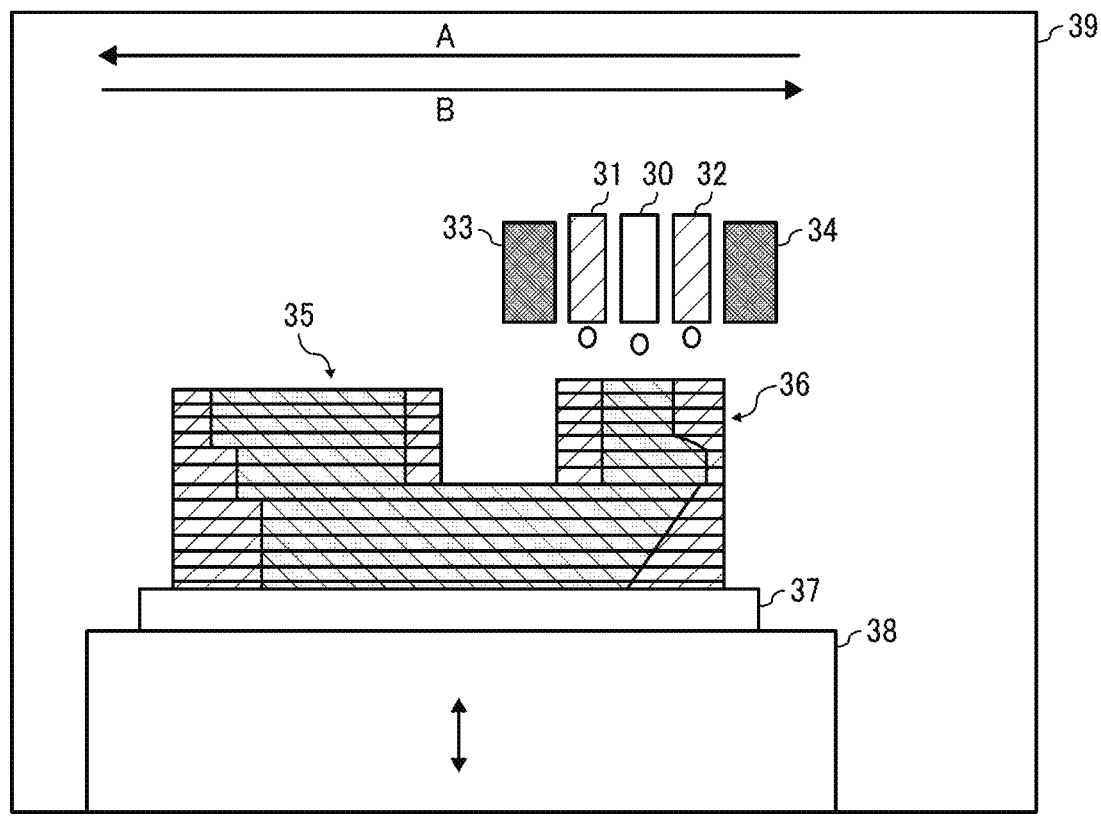
FIG. 2 is a schematic view of an image forming apparatus according to an embodiment of the present invention.
Figure 3A:
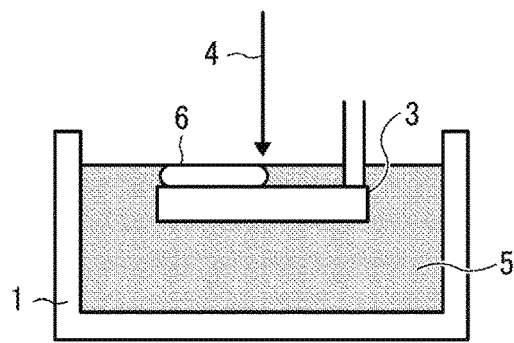
FIGS. 3A to 3D are schematic views of an image forming apparatus according to an embodiment of the present invention.
Figure 3B:
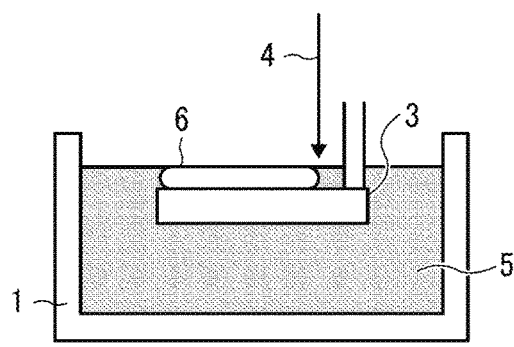
Figure 3C:
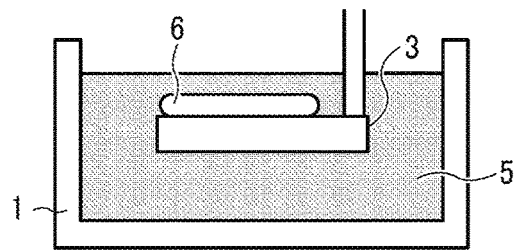
Figure 3D:
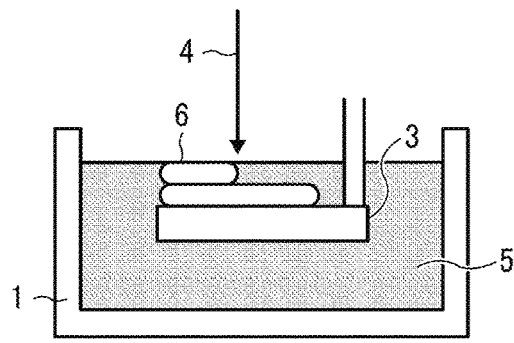

For example, the curable composition can be applied to inks for forming two-dimensional texts and images and design coatings on various substrates. As another example, the curable composition can be applied to molding materials for forming three-dimensional images (i.e., three-dimensional objects). The molding materials for forming three-dimensional objects can be used as a binder for binding powder particles in additive manufacturing that forms a three-dimensional object by repeatedly hardening and laminating powder layers. The materials for forming three-dimensional objects can also be used as a model material and a support material for use in stereolithography (one specific example of additive manufacturing) as illustrated in FIG. 2 and FIGS. 3A to 3D. FIG. 2 is an illustration of a method in which the curable composition according to an embodiment of the present invention is discharged to a certain region and exposed to an active energy ray to cure, and the cured layers are sequentially laminated to form a three-dimensional object. Details of this method is described later. FIGS. 3A to 3D are illustrations of another method in which an active energy ray curable composition 5 according to an embodiment of the present invention is retained in a pool 1 and exposed to an active energy ray 4 to be formed into a cured layer 6 on a movable stage 3, and the cured layers 6 are sequentially laminated to form a three-dimensional object.

The curable composition according to an embodiment of the present invention can be used for three-dimensional object forming apparatuses that may include a storage for storing the curable composition, a supplier, a discharger, and an active energy ray emitter.

The curable composition according to an embodiment of the present invention may be caused to cure to become a cured product. The cured product may be formed on a substrate to form a structural body with the substrate. The structural body may be processed into a processed product. The processed product may be produced by subjecting a sheet-like or film-like cured product or structural body to a molding processing such as stretching processing (optionally with heat) and punching processing. The processed product is preferably used for meters and operation panels of automobiles, office automation equipments, electric or electronic devices, and cameras, which typically need to be surface-decorated.

Specific examples of the substrate include, but are not limited to, paper, thread, fiber, fabric, leather, metal, plastic, glass, wood, ceramic, and composite materials thereof. Among these materials, plastic substrates are preferable from the aspect of processability.

Absorptive substrates, such as high-quality paper sheets, are practically used in combination with both water-based inks and oil-based inks, which are not quick-drying, with the expectation of permeation and drying effects thereof. On the other hand, non-permeable substrates made of materials such as matt coated paper, gloss coated paper, plastic film, plastic molded product, ceramic, glass, and metal are practically used in combination with quick-drying inks. In this case, the curable composition or ink according to an embodiment of the present invention is preferably used since it can rapidly cure upon light irradiation. The curable composition according to an embodiment of the present invention is preferably used for such non-permeable and poorly-adhesive substrates, more preferably for polyethylene terephthalate (PET), polypropylene, and glass substrates. In some cases, PET and polypropylene substrates are subjected to a corona treatment for the purpose of activating their surfaces and improving adhesiveness. The curable composition or ink according to an embodiment of the present invention exhibits good adhesiveness to such substrates even when the corona treatment, accompanied electric spark generation, cannot be performed.

Image Forming Method and Image Forming Apparatus

An image forming method according to an embodiment of the present invention includes at least the process of emitting an active energy ray to the curable composition to cause the curable composition to cure. An image forming apparatus according to an embodiment of the present invention includes at least an emitter to emit an active energy ray to the curable composition and a storage to store the curable composition. The storage may include a container. The image forming method may further include the process of discharging the curable composition. The image forming apparatus may further include a discharger to discharge the curable composition. The discharging method may be of a continuous injection type or an on-demand type, but is not limited thereto. Specific examples of the on-demand-type discharging method include thermal methods and electrostatic methods.

FIG. 1 is a schematic view of an image forming apparatus according to an embodiment of the present invention that includes an inkjet discharger. The image forming apparatus illustrated in FIG. 1 includes printing units 23a, 23b, 23c, and 23d and a supply roller 21. Each of the printing units 23a, 23b, 23c, and 23d includes an ink cartridge containing an active energy ray curable ink having yellow, magenta, cyan, and black colors, respectively, and a discharge head. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d may be equipped with a heater for liquefying the ink at an ink discharging part. Furthermore, the printing units 23a, 23b, 23c, and 23d may be equipped with a cooler for cooling the recording medium to room temperature with or without contacting the recording medium. The image forming apparatus illustrated in FIG. 1 may be an inkjet recording apparatus employing either a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

Specific preferred materials for the recording medium 22 include, but are not limited to, paper, film, metal, and composite materials thereof, which may be in the form of a sheet. The image forming apparatus illustrated in FIG. 1 may be capable of either one-side printing or duplex printing.

Active energy rays emitted from the light sources 24a, 24b, and 24c may be weakened or eliminated, and after multiple color images have been printed, an active energy ray may be emitted from the light source 24d. In this case, energy consumption and cost are reduced.

Recorded matters recorded by the ink according to an embodiment of the present invention include those printed on smooth surfaces such as normal paper and resin films, those printed on irregular surfaces, and those printed on surfaces of various materials such as metal and ceramics. By laminating two-dimensional images, a partially-three-dimensional image (including two-dimensional parts and three-dimensional parts) or a three-dimensional object can be obtained.

FIG. 2 is a schematic view of a three-dimensional image forming apparatus according to an embodiment of the present invention, as described above. Referring to FIG. 2, an image forming apparatus 39 includes a discharge head unit 30 for forming object layers, discharge head units 31 and 32 for forming support layers, and ultraviolet emitters 33 and 34 disposed adjacent to the discharge head units 30, 31, and 32. Each of the discharge head units 30, 31, and 32 includes an inkjet head and is movable in the directions indicated by arrows A and B in FIG. 2. The discharge head unit 30 discharges a first active energy ray curable composition, and the discharge head units 31 and 32 each discharge a second active energy ray curable composition different from the first active energy ray curable composition. The ultraviolet emitters 33 and 34 cause the active energy ray curable compositions to cure. The cured products are laminated in the image forming apparatus 39. More specifically, first, the second active energy ray curable composition is discharged from the discharge head units 31 and 32 onto an object supporting substrate 37 and exposed to an active energy ray to cure, thus becoming a first support layer having a reservoir. Next, the first active energy ray curable composition is discharged from the discharge head unit 30 onto the reservoir and exposed to an active energy ray to cure, thus becoming a first object layer. These processes are repeated multiple times, in accordance with the set number of lamination, while lowering a stage 38 that is movable in the vertical direction, to laminate the support layers and the object layers. Thus, a three-dimensional object 35 is obtained. A support layer lamination 36 is removed thereafter, if necessary. In the embodiment illustrated in FIG. 2, the number of discharge head unit 30 for forming object layers is one. Alternatively, the number thereof may be two or more.

In accordance with some embodiments of the present invention, an active energy ray curable composition can be reliably discharged at high frequencies ranging from 10 to 20 kHz.

Examples

Further understanding can be obtained by reference to certain specific examples which are provided herein for the purpose of illustration only and are not intended to be limiting.

The below-listed materials were mixed according to the blending ratios described in Tables 2 to 4 (numerical values represent parts by mass), thus preparing active energy ray curable compositions.
(A) Polymerizable Monomer Components
  (A1) Diethylene glycol dimethacrylate (NK ESTER 2G available from Shin-Nakamura Chemical Co., Ltd.)
  (A2) Glycerol dimethacrylate (NK ESTER 701 available from Shin-Nakamura Chemical Co., Ltd.)
  (A3) Acryloylmorpholine (ACMO available from KJ Chemicals Corporation)
  (A4) Cyclic trimethylolpropane formal acrylate (VISCOAT #200 available from Osaka Organic Chemical Industry Ltd.)
  (A5) Tetrahydrofurfuryl methacrylate (LIGHT ESTER THF1000 available from Kyoeisha Chemical Co., Ltd.)
(B) Resin Components
  (B1) Polystyrene (VS1063 available from SEIKO PMC CORPORATION, Mw (weight average molecular weight)=5,100)
  (B2) Polyester-based resin (VYLON® 802 available from Toyobo Co., Ltd., Mw=5,400)
  (B3) Polyester-based resin (VYLON® 220 available from Toyobo Co., Ltd., Mw=4,700)
  (B4) Polystyrene (HIMER-ST-95 available from Sanyo Chemical Industries, Ltd., Mw=5,600)
  (B5) Polyester-based resin (9940A available from Hitachi Chemical Company, Ltd., Mw=56,000)
  (B6) Polyester-based resin (TESRACK 2464 available from Hitachi Chemical Company, Ltd., Mw=1,000)
  (B7) Polystyrene (HIMER-ST-120 available from Sanyo Chemical Industries, Ltd., Mw=15,000)
(C) Polymerization Initiators
  (C1) IRGACURE 379 available from BASF
  (C2) IRGACURE 184 available from BASF Measurement of Spin-Spin Relaxation Time by CPMG Method for Pulse NMR Analysis The spin-spin relaxation time (T2) was measured as follows.

As a measuring instrument, a minispec mq pulse NMR (available from Bruker) was used.

First, 70 parts by mass of diethylene glycol dimethacrylate and 30 parts by mass of a resin was mixed to prepare a mixed solution, and 1 ml of the mixed solution was weighed in an NMR tube having a diameter of 10 mm.

A measurement was started 5 seconds after the NMR tube was set in the instrument. The measurement was performed three times under the following conditions, and the second and third measurement results, being measured under stable temperature, were averaged.

First 90° Pulse Separation: 0.01 msec
Final Pulse Separation: 0.2 msec
Number of Data Point for Fitting: 3,000 points
Cumulated Number: 32 times Temperature: 25° C.

The spin-spin relaxation time (T2) was calculated by exponentially approximating the obtained attenuation curve using a software program Origin® 8.5 (available from OriginLab Corp.).

The results are presented in Table 1.

Measurement of Viscosity

A viscosity at 25° C. of diethylene glycol dimethacrylate alone and that of the mixed solution of 30 parts by mass of diethylene glycol dimethacrylate and 70 parts by mass of each resin were measured to determine the ratio of the viscosity at 25° C. of the mixed solution to that of diethylene glycol dimethacrylate alone (this ratio is hereinafter referred to as "viscosity increase rate").

The viscosity was measured with a cone-plate rotary viscometer (VISCOMETER TVE-22L available from Toki Sangyo Co., Ltd.) using a cone rotor (1°34'×R24) while setting the revolution to 50 rpm and the temperature of the constant-temperature circulating water to 25° C.

The results are presented in Table 1.

TABLE 1

|  | Viscosity (mPa·s) | Viscosity Increase Rate | Spin-spin Relaxation Time (ms) |
|---|---|---|---|
| Diethylene glycol dimethacrylate alone | 5.43 | — | — |
| Mixed solution of 70 parts by mass of diethylene glycol dimethacrylate and 30 parts by mass of polystyrene (B1) | 83 | 15.3 | 233 |
| Mixed solution of 70 parts by mass of diethylene glycol dimethacrylate and 30 parts by mass of polyester (B2) | 143.7 | 26.5 | 184 |
| Mixed solution of 70 parts by mass of diethylene glycol dimethacrylate and 30 parts by mass of polyester (B3) | 124.5 | 22.9 | 183 |
| Mixed solution of 70 parts by mass of diethylene glycol dimethacrylate and 30 parts by mass of polystyrene (B4) | 63.7 | 11.7 | 247 |

TABLE 1-continued

|  | Viscosity (mPa·s) | Viscosity Increase Rate | Spin-spin Relaxation Time (ms) |
|---|---|---|---|
| Mixed solution of 70 parts by mass of diethylene glycol dimethacrylate and 30 parts by mass of polystyrene (B5) | 300 | 55.2 | 350 |
| Mixed solution of 70 parts by mass of diethylene glycol dimethacrylate and 30 parts by mass of polystyrene (B6) | 60 | 11.0 | 180 |
| Mixed solution of 70 parts by mass of diethylene glycol dimethacrylate and 30 parts by mass of polystyrene (B7) | 250 | 46.0 | 270 |

Dischargeability Test

Each active energy ray curable composition was subject to a measurement of the length of ligaments and discharge frequency dependency using a simple particle apparatus (DropStation from GENSIS). Each composition was discharged from a head MH5420 (available from Ricoh Co., Ltd.) having a temperature of from 24° C. to 30° C. As discharge conditions, the voltage was set to 19 V and a velocity Vj was set to 7 (+0.5) m/s. Here, the velocity Vj is a velocity of a liquid droplet of the discharged composition measured when the distance between the leading end of the liquid droplet and the nozzle becomes 1 mm. The flying liquid droplets were observed with a CMOS (complementary metal-oxide semiconductor) camera ARTCAM-036MI (available from ARTRAY CO., LTD.) disposed perpendicular to the direction of discharging of the composition, to measure the length of ligaments and discharge frequency dependency. The camera was set in such a manner that a liquid droplet was observable from when the leading end of the liquid droplet passing a position 1 mm away from the nozzle until the trailing end of the liquid droplet passing the position.

Length of Ligaments

The composition was discharged by a waveform having a pulse rise time of 2 μs, a sustaining time of 2 μs, and a fall time of 2 μs (hereinafter "simple pull waveform") at a frequency of 2 kHz. The flying liquid droplets were observed with the CMOS camera, and the length of a ligament was determined from the time (μs) elapsed from when the leading end of the liquid droplet passing a position 1 mm away from the nozzle until the trailing end of the liquid droplet passing the position.

Discharge Frequency Dependency

The composition was discharged by the above simple pull waveform at a frequency of 10 kHz and 20 kHz. At each frequency, the flying liquid droplets were observed to determine whether misfiring occurred or not and whether liquid droplets were discharged without coalescing with one another. Discharge frequency dependency was evaluated to be "Poor" when misfiring occurred and liquid droplets were coalesced with one another at 20 kHz or less, and "Good" when liquid droplets were normally discharged without coalescing with one another at 20 kHz.

Adhesiveness Test

Each active energy ray curable composition was applied onto two types of substrates: a polyethylene terephthalate film (E5100 available from Toyobo Co., Ltd., having a thickness of 100 μm) and a glass plate (S9213 available from Matsunami Glass Ind., Ltd., having a thickness of 1.2 mm). The applied composition was irradiated with ultraviolet rays to become a cured film having a thickness of 5 μm, thus preparing a test piece. The polyethylene terephthalate film used above had been surface-treated by a corona treatment.

UV irradiation was performed by an UV curing system Light Hammer® 6 (D bulb) available from Heraeus Noblelight Fusion UV Inc. at 0.2 W/cm² and 3 J/cm². The cured films obtained in all the Examples and Comparative Examples were found to be not sticky when touching with finger.

These cured films were subjected to an evaluation of adhesiveness to the substrates by a tape peeling test using a transparent pressure-sensitive adhesive tape (CELLOTAPE (registered trademark) CT-18 available from Nichiban Co., Ltd.). The cured films were also subjected to an evaluation of adhesion to the substrates by the cross-cut test defined in JIS (Japanese Industrial Standards) Specification K-5600-5-6, with and without making cuts thereon. When cuts are made on the cured film, inner stress of the film can be relaxed from the edges of the cuts and peeling off of the film is triggered therefrom. Thus, an evaluation with cuts generally results in a more sever condition. When no cut is made on the cured film, there is no trigger for peeing off of the film. Thus, an evaluation without cuts is a relatively not severe condition. The term "adhesion" used in the JIS Specification has the same meaning as the "adhesiveness" in the present disclosure.

In the tape peeling test, a piece of the transparent pressure-sensitive adhesive tape was adhered to the cured film and thereafter peeled off. The test results were evaluated to be "Good" when no peeling of the cured film was observed and "Poor" when peeling of the cured film was observed. In the cross-cut test, 25-square-grid-like (5×5) cuts were made on the cured film, and a piece of a tape was adhered thereto and thereafter peeled off. The test results were evaluated to be "Good" when no peeling of the cured film was observed and "Poor" when peeling of the cured film was observed. It is to be noted that slight peeling observed at intersections of the cuts, occurred under a strong influence of the strength of the cutting, was ignored.

Overall evaluation results of the adhesiveness tests were ranked as follows.

Excellent: "Good" in the tape peeling test and "Good" in the cross-cut test.

Good: "Good" in the tape peeling test and "Poor" in the cross-cut test.

Poor: "Poor" in the tape peeling test and "Poor" in the cross-cut test.

The results are presented in Tables 2 to 4. In the "adhesiveness" rows in Tables 2 to 4, "N/A" indicates that no evaluation was conducted.

TABLE 2

|  |  | Materials | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| A | A1 | Diethylene glycol dimethacrylate | 90 | 90 | 90 | 80 | 95 | 90 | 77 | 70 | 50 | 50 |
|  | A2 | Glycerol dimethacrylate | — | — | — | — | — | — | 16 | — | — | — |

TABLE 2-continued

|   |   | Materials | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
|   | A3 | Acryloylmorpholine | — | — | — | — | — | — | — | 10 | 30 | — |
|   | A4 | Cyclic trimethylolpropane formal acrylate | — | — | — | — | — | — | — | — | — | 30 |
|   | A5 | Tetrahydrofurfuryl methacrylate | — | — | — | — | — | — | — | — | — | — |
| B | B1 | VS1063 | 10 | — | — | — | — | — | 7 | — | — | — |
|   | B2 | VYLON® 802 | — | 10 | — | 20 | 5 | 10 | — | 20 | 20 | 20 |
|   | B3 | VYLON® 220 | — | — | 10 | — | — | — | — | — | — | — |
|   | B4 | HIMER-ST-95 | — | — | — | — | — | — | — | — | — | — |
|   | B5 | 9940A | — | — | — | — | — | — | — | — | — | — |
|   | B6 | "TESURAKKU" 2464 | — | — | — | — | — | — | — | — | — | — |
|   | B7 | HIMER-ST-120 | — | — | — | — | — | — | — | — | — | — |
| C | C1 | IRGACURE 184 | 10 | 10 | 10 | 10 | 10 | — | 10 | 10 | 10 | 10 |
|   | C2 | IRGACURE 379 | — | — | — | — | — | 10 | — | — | — | — |
| Dischargeability | | Ligament Length (μs) | 44 | 37 | 39 | 50 | 34 | 37 | 40 | 50 | 50 | 50 |
|   |   | Discharge Frequency Dependency | Good | Good | Good | Good | Good | Good | Good | Good | Good | Good |
| Adhesiveness | | PET (with corona treatment) | Good | Good | Good | Excellent | Good | Good | Good | Excellent | Excellent | Excellent |
|   |   | Glass | Good | Good | Good | Good | Good | Good | Good | Excellent | Excellent | Excellent |

TABLE 3

|   |   | Materials | Example 11 | Example 12 | Example 13 | Example 14 | Example 15 | Example 16 | Example 17 | Example 18 | Example 19 |
|---|---|---|---|---|---|---|---|---|---|---|---|
| A | A1 | Diethylene glycol dimethacrylate | 50 | 70 | 50 | 50 | 50 | 70 | 50 | 50 | 50 |
|   | A2 | Glycerol dimethacrylate | — | — | — | — | — | — | — | — | — |
|   | A3 | Acryloylmorpholine | — | 10 | 30 | — | — | 10 | 30 | — | — |
|   | A4 | Cyclic trimethylolpropane formal acrylate | — | — | — | 30 | — | — | — | 30 | — |
|   | A5 | Tetrahydrofurfuryl methacrylate | 30 | — | — | — | 30 | — | — | — | 30 |
| B | B1 | VS1063 | — | — | — | — | — | 20 | 20 | 20 | 20 |
|   | B2 | VYLON® 802 | 20 | — | — | — | — | — | — | — | — |
|   | B3 | VYLON® 220 | — | 20 | 20 | 20 | 20 | — | — | — | — |
|   | B4 | HIMER-ST-95 | — | — | — | — | — | — | — | — | — |
|   | B5 | 9940A | — | — | — | — | — | — | — | — | — |
|   | B6 | "TESURAKKU" 2464 | — | — | — | — | — | — | — | — | — |
|   | B7 | HIMER-ST-120 | — | — | — | — | — | — | — | — | — |
| C | C1 | IRGACURE 184 | 10 | 10 | 10 | 10 | 10 | 10 | 10 | 10 | 10 |
|   | C2 | IRGACURE 379 | — | — | — | — | — | — | — | — | — |
| Dischargeability | | Ligament Length (μs) | 50 | 50 | 50 | 50 | 50 | 50 | 50 | 50 | 50 |
|   |   | Discharge Frequency Dependency | Good | Good | Good | Good | Good | Good | Good | Good | Good |
| Adhesiveness | | PET (with corona treatment) | Excellent | Excellent | Excellent | Excellent | Excellent | Excellent | Excellent | Excellent | Excellent |
|   |   | Glass | Excellent | Excellent | Excellent | Excellent | Excellent | Excellent | Excellent | Excellent | Excellent |

TABLE 4

|   |   | Materials | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| A | A1 | Diethylene glycol dimethacrylate | 56 | 90 | 50 | 90 | 90 | 90 | 50 |
|   | A2 | Glycerol dimethacrylate | 44 | — | — | — | — | — | — |
|   | A3 | Acryloylmorpholine | — | — | 50 | — | — | — | 30 |
|   | A4 | Cyclic trimethylolpropane formal acrylate | — | — | — | — | — | — | — |
|   | A5 | Tetrahydrofurfuryl methacrylate | — | — | — | — | — | — | — |
| B | B1 | VS1063 | — | — | — | — | — | — | — |
|   | B2 | VYLON® 802 | — | — | — | — | — | — | — |
|   | B3 | VYLON® 220 | — | — | — | — | — | — | — |

TABLE 4-continued

| | Materials | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | B4 | HIMER-ST-95 | — | 10 | — | — | — | — | 20 |
| | B5 | 9940A | — | — | — | 10 | — | — | — |
| | B6 | "TESURAKKU" 2464 | — | — | — | — | 10 | — | — |
| | B7 | HIMER-ST-120 | — | — | — | — | — | 10 | — |
| C | C1 | IRGACURE 184 | 10 | 10 | 10 | 10 | 10 | 10 | 10 |
| | C2 | IRGACURE 379 | — | — | — | — | — | — | — |
| Dischargeability | | Ligament Length (μs) | 30 | 170 | 30 | 250 | 40 | 200 | 200 |
| | | Discharge Frequency Dependency | Good | Poor | Good | Poor | Good | Poor | Poor |
| Adhesiveness | | PET (with corona treatment) | Poor | N/A | Poor | N/A | Good | N/A | N/A |
| | | Glass | Poor | N/A | Poor | N/A | Poor | N/A | N/A |

Comparison of Example 1 and Comparative Example 1 indicates that an active energy ray curable composition containing a resin is superior to that containing no resin in terms of adhesiveness to poorly-adhesive substrates.

Comparison of Example 1 and Comparative Example 2, comparison of Example 2 and Comparative Example 2, and comparison of Example 3 and Comparative Example 2 indicate that discharge frequency dependency is excellent when the viscosity at 25° C. of the mixed solution of 70 parts by mass of diethylene glycol dimethacrylate and 30 parts by mass of each resin is 15 to 30 times that of diethylene glycol dimethacrylate alone, the spin-spin relaxation time of the mixed solution measured by a CPMG method for pulse NMR analysis was 240 ms or less, and the resin has a polystyrene or polyester structure.

Comparison of Example 1 and Example 7 indicates that dischargeability and adhesiveness are not influenced by addition of a monomer other than diethylene glycol dimethacrylate.

Comparison of Example 2 and Example 4 indicates that adhesiveness can be improved while maintaining a constant level of dischargeability by increasing the blending amount of the resin.

Comparison of Example 2 and Example 5 indicates that dischargeability can be improved while maintaining a constant level of adhesiveness by decreasing the blending amount of the resin.

Comparison of Example 2 and Example 6 indicates that dischargeability and adhesiveness are both excellent regardless of the type of polymerization initiator.

Comparison of Example 4 and Example 8 indicates that adhesiveness to glass can be improved while maintaining dischargeability by including a monofunctional acylate or methacrylate having a cyclic ether structure.

Comparison of Example 8 and Example 9 indicates that dischargeability and adhesiveness can be remained at constant levels by increasing the blending amount of the acrylate or methacrylate.

Comparison of Example 9 and Example 10 and comparison of Example 9 and Example 11 indicate that adhesiveness to glass can be maintained regardless of the type of the acrylate or methacrylate.

Comparison of Examples 8, 12, and 16 and Comparative Example 7 indicates that dischargeability is excellent even if a monofunctional acylate or methacrylate having a cyclic ether structure was added to the mixed solution of 70 parts by mass of diethylene glycol dimethacrylate and 30 parts by mass of the resin, when the viscosity at 25° C. of the mixed solution is 15 to 30 times that of diethylene glycol dimethacrylate alone, the spin-spin relaxation time of the mixed solution measured by a CPMG method for pulse NMR analysis was 240 ms or less, and the resin has a polystyrene or polyester structure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A curable composition, comprising:
   diethylene glycol dimethacrylate; and
   a resin having a polystyrene structure,
   wherein:
   the following conditions (1) to (2) are satisfied:
   (1) a mixed solution of 70 parts by mass of the diethylene glycol dimethacrylate and 30 parts by mass of the resin exhibits a viscosity 15 to 30 times that of the diethylene glycol dimethacrylate alone at 25° C.; and
   (2) the mixed solution exhibits a spin-spin relaxation time of 240 ms or less measured by a CPMG method for pulse nuclear magnetic resonance analysis;
   the curable composition does not contain glycerol dimethacrylate; and
   the curable composition does not contain an ethylene oxide-modified trimethylolpropane trimethacrylate.

2. The curable composition of claim 1, further comprising:
   a monofunctional acrylate or methacrylate having a cyclic ether structure.

3. The curable composition of claim 2, wherein the monofunctional acrylate or methacrylate having a cyclic ether structure accounts for 10 to 30 parts by mass out of 100 parts mass of the diethylene glycol dimethacrylate, the resin, and the monofunctional acrylate or methacrylate having a cyclic ether structure in total.

4. The curable composition of claim 1, wherein the resin accounts for 5 to 20 parts by mass out of 100 parts by mass of the diethylene glycol dimethacrylate and the resin in total.

5. The curable composition of claim 4, wherein the resin accounts for 10 to 20 parts by mass out of 100 parts by mass of the diethylene glycol dimethacrylate and the resin in total.

6. The curable composition of claim 2, wherein the resin accounts for 5 to 20 parts by mass out of 100 parts by mass of the diethylene glycol dimethacrylate, the resin, and the monofunctional acrylate or methacrylate having a cyclic ether structure in total.

7. The curable composition of claim 6, wherein the resin accounts for 10 to 20 parts by mass out of 100 parts by mass of the diethylene glycol dimethacrylate, the resin, and the monofunctional acrylate or methacrylate having a cyclic ether structure in total.

8. The curable composition of claim 1, further comprising:
a polymerization initiator.

9. A curable ink, comprising the curable composition of claim 1.

10. An inkjet ink, comprising the curable ink of claim 9.

11. A method for forming two-dimensional or three-dimensional images, the method comprising:
emitting an active energy ray to the curable composition of claim 1.

12. The method for forming two-dimensional or three-dimensional images of claim 11, further comprising:
discharging the curable composition,
wherein, in the emitting, the active energy ray is emitted to the curable composition discharged in the discharging.

13. The method for forming two-dimensional or three-dimensional images of claim 12, wherein, in the discharging, the curable composition is discharged at a frequency of from 10 to 20 kHz.

14. An apparatus for forming two-dimensional or three-dimensional images, the apparatus comprising:
a storage storing the curable composition of claim 1; and
an emitter to emit an active energy ray.

15. A cured product produced by curing the curable composition of claim 1.

16. A structural body, comprising:
a substrate; and
the cured product of claim 15.

17. A processed product produced by processing the structural body of claim 16.

18. The curable composition of claim 1, wherein a mass ratio of the diethylene glycol dimethacrylate to the resin ranges from 50/20 to 95/5.

* * * * *